June 26, 1945.  J. R. MOOREHEAD  2,379,315

ENGINE MOUNTING STRUCTURE

Filed Sept. 28, 1944  2 Sheets-Sheet 1

INVENTOR.
J. R. Moorehead
BY James M. Clark
His Patent Attorney

June 26, 1945.    J. R. MOOREHEAD    2,379,315
ENGINE MOUNTING STRUCTURE
Filed Sept. 28, 1944    2 Sheets-Sheet 2
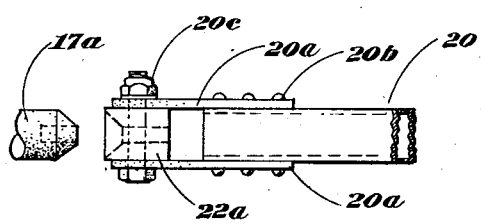
Fig. 5
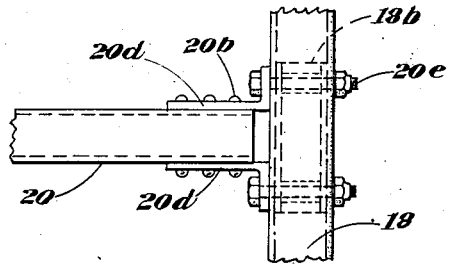
Fig. 7
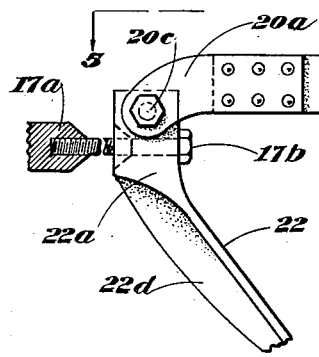
Fig. 6
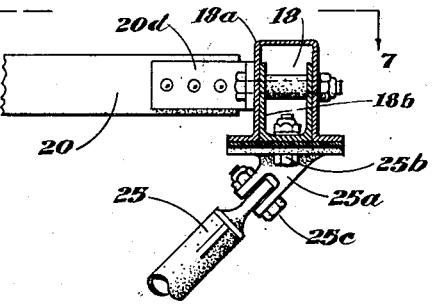
Fig. 8
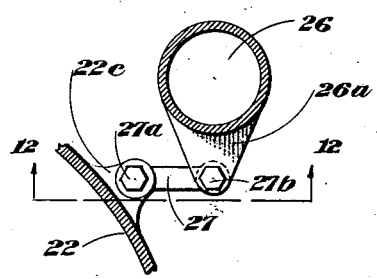
Fig. 11
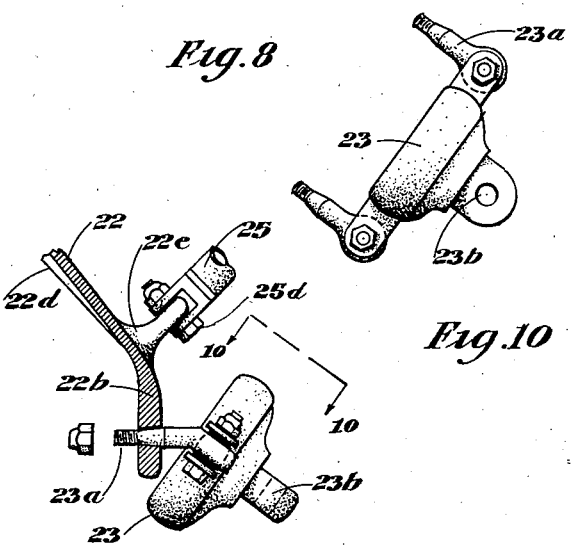
Fig. 10
Fig. 9
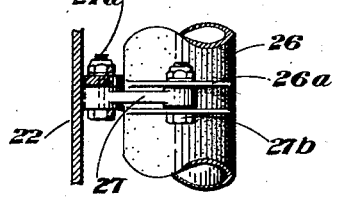
Fig. 12
INVENTOR.
J. R. Moorehead
BY James M. Clark
His Patent Attorney Patented June 26, 1945

2,379,315

UNITED STATES PATENT OFFICE 2,379,315

ENGINE MOUNTING STRUCTURE

James R. Moorehead, Tacoma, Wash., assignor to Boeing Aircraft Company, a corporation of Washington Application September 28, 1944, Serial No. 556,179

10 Claims. (Cl. 248—5)

The present invention relates to aircraft power plant arrangements and more particularly to improvements in engine mounting structures.

The problems attending the design of aircraft power plant supports have been increased and complicated to a great extent by the progressive use of engines of higher output and the corresponding increase in the forces due to weight, as well as those resulting from thrust, torque and periodic vibrations. The transmission of the latter forces to the supporting structure and fuselage has been reduced to a considerable degree by the use of improved resilient shock absorbing units, but prior efforts to provide satisfactory engine mount structures have resulted in appreciable weight, in mounts containing numerous welded joints of the tubular struts, or in structures which have otherwise presented difficulties in their repair and replacement, as well as the servicing of the engine and its accessories. The present invention is directed to an improved mount structure utilizing plate-like forgings braced from adjacent bulkhead rings for the support of the power unit and propeller, and obviates the conventional mounting rings as well as many of the foregoing difficulties.

It is a major object of the present invention to provide an improved power plant arrangement which includes a novel engine mount structure of advanced design. It is also an object to provide an engine mount structure of a simplified construction of relatively great strength-to-weight ratio which obviates the use of the conventional mounting ring, while at the same time providing attachments for the individual shock absorbing units.

It is a further object of the present invention to provide a mounting structure comprising a plurality of substantially identical bracket assemblies. A further object resides in the utilization of flat plate-like brackets of either forged or cast construction, braced from adjacent cowl and fuselage rings to form the major support elements to which the engine is resiliently attached. Another object resides in the use of such brackets to enable the engine to be hung securely and to dispense with the complicated triangulation of welded tubular struts heretofore widely used in providing circular ring mounts.

A further object of the invention resides in a structural arrangement for the engine support which additionally affords a simple and sturdy means for making the ring cowl support rigid whether it be circular, elliptical or of other shape. Among the further objects of this invention are the provisions of a simplified all pin-connected engine mount structure having relatively few parts of different size and shape adapted to readily facilitate the assembly, disassembly and servicing of the engine and its mount. Other objects and advantages of the present invention will become obvious to those skilled in the art after a reading of the following specification and the accompanying drawings forming a part hereof, in which:

Figs. 5 and 6 show detailed top plan and side elevational views, respectively, of the bracket connection to the fire-wall fitting;

Figs. 7 and 8 show similar top plan and side elevational views, respectively, of the connections of the mounting structure at the cowl supporting ring;

Figs. 9 and 10 show transverse and projected views, respectively, of the connection of the resilient mounting unit to the supporting bracket; and Figs. 11 and 12 show transverse and bottom plan views, respectively, of the support for the exhaust collector ring from the supporting bracket.

Figures 3, 4:
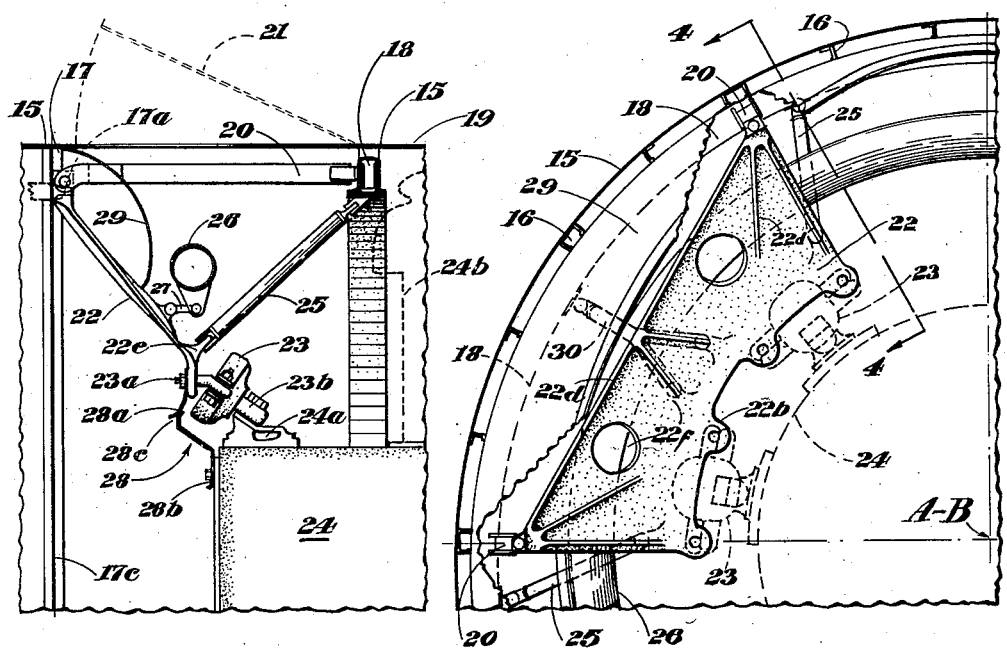
Fig. 3 is an enlarged sectional elevation of one of the mounting assemblies shown in Fig. 2.
Fig. 4 is an enlarged side elevation of the mounting assembly as taken along the lines 4—4 of Fig. 3.

Referring now to Figs. 1 to 4 inclusive, the numeral 15 represents the external covering or skin of the fuselage, the covering being stiffened by means of the longitudinal elements 16 and terminating in a forward annular fuselage member 17 substantially coincident with the engine fire wall 17c. Forward of the fire-wall ring or frame member 17, there is disposed a composite cowl supporting ring or frame 18 for the support of the engine cowl 19, the said annular rings 17 and 18 being interconnected by a longitudinally extending tie or frame element 20. It will be understood that, whereas 15 has been referred to as a fuselage portion, it may also be a nacelle supported from the wing or other portion of the airplane; and the rings 17 and 18, as well as the cowl 19, being referred to as annular in cross section may be circular, elliptical or of other shape. The annular zone or space between the trailing portion of the cowl 19 and the forward terminal ring 17 of the fuselage or nacelle 15 is preferably provided with cowl flaps or gills 21 of any conventional type for controlling the outflow of the cooling air past the engine cylinders 24b.

Figures 1, 2:
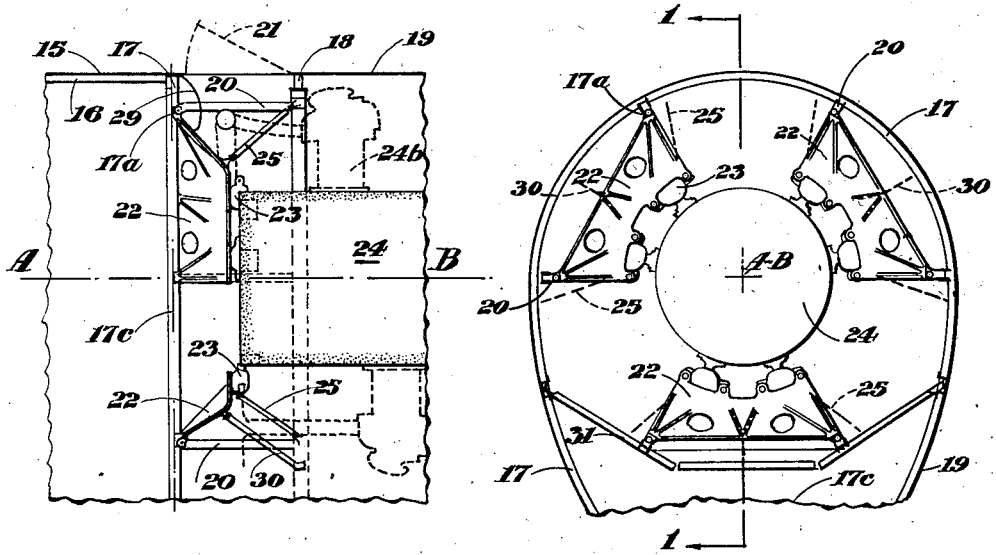
Fig. 1 is a fragmentary transverse sectional view showing the relationship of the present mounting structure with respect to the engine, its cowl and the adjacent fuselage structure, as taken along the lines 1—1 of Fig. 2.
Fig. 2 is a transverse sectional elevation of the engine mount structure as viewed looking forward.

To the terminal formed by the connection of the longitudinal brace element 20 with the firewall ring 17, there is attached a cast or forged, plate-like or planar, bracket 22 extending inwardly and forwardly from the fire-wall 17c. The engine mount structure preferably incorporates three such forgings 22 of identical form and construction, spaced substantially 120° apart, as shown in Fig. 2. The inner portion of the brackets 22 is provided with a plurality of apertured lugs 22b for attachment of the resilient units 23 which in turn are attached to the mounting fittings on the radial engine 24. Additional attachment lugs 22e are provided on the brackets 22 for attachment to the tubular struts 25 extending between the lower or inner radial edges of each bracket to connections with the cowl support ring 18. Additional forked struts 30 are similarly attached to intermediate lugs on the bracket 22 extending to connections at the cowl support ring 18 as shown in Fig. 3.

It will accordingly be noted that each bracket 22 is attached in a rigid manner to the airplane structure by means of the peripherally spaced triangular frames located at each radial edge of the bracket and comprise the strut elements 20, 25 and 30. Each bracket 22 is comprised of a long straight side forming a chord of the annular ring 17, ends which extend radially of the ring converging toward its common axis A—B and an arcuate inner side provided with the lugs 22b forming an interrupted engine mounting ring. The plates or brackets 22 form the side faces of a truncated triangular or interrupted polygonal pyramid having its base at the ring 17 and extending toward an apex forwardly disposed on the axis A—B. The details of the connections between these structural elements will be more fully described below in connection with the enlarged views in Figs. 5 to 12 inclusive.

Referring further to Figs. 3 and 4, it will be noted that an exhaust collector ring 26 of generally circular form is disposed such that it passes through the triangular frame formed by the brackets 22 and the struts 20, 25 and 30, being supported from the brackets by means of the links 27. There is also preferably provided at the aft end of the engine 24 an engine seal 28, comprising the seal half portions 28a and 28b, provided with a sliding or wiping contact at 28c. This joint at 28c accommodates movement of the engine 24 upon its resilient mounting units 23 with respect to the rigid structure terminating in the inwardly extending lugs 22b and the brackets 22. An inner cowl portion 29 is also preferably provided aft of the collector ring 26 extending from the bracket 22 outwardly to the junction of the nacelle covering 15 and the trailing portions of the cowl flaps 21 to provide smooth outflow for the cooling air.

Referring now to Figs. 5 to 8 inclusive, it will be noted that the fire-wall 17c is provided with conical shaped fire-wall fittings 17a for engagement by the countersunk conic portions 22a of the brackets 22, and are suitably tapped to receive the attachment bolts 17b. The portions 22a of the brackets 22 are also transversely apertured to receive the bifurcated plate elements 20a of the tubular frame elements 20, being attached thereto by the bolts 20c, the plates being suitably attached as by the rivets 20b. The cowl supporting ring 18 is of composite reinforced construction at the attachment points of the struts 20, 25, and 30, being formed of the continuous hat-shaped channel 18a into which is fitted or nested short channel portions 18b at these attachment points. The forward terminal of each frame element 20 is provided with framing angles 20d attached by the rivets 20b, and to the cowl support ring 18 by means of the through-bolts 20e. The forward outer terminals of the tubular struts 25 are suitably apertured for bolting or pin connections 25c to the bifurcated or clevis terminal fittings 25a attached to the inner portions of the cowl ring 18 as by the bolts 25b. The outer terminals of the intermediate forked brace struts 30 are preferably similarly connected to fittings attached to the inner flanges of the locally reinforced ring 18.

The inner attachment portions 22b of the brackets 22 are angularly disposed with respect to the general inclined plane of the brackets such that the lugs 22b are transversely disposed with respect to the longitudinal axis A—B of the power plant and its supporting mount. These lugs are preferably conically apertured to receive the elastic or resilient mounting units 23 and the conically formed attachment bolts 23a. These resilient units 23 may be any one of the known and commercially available products used for the resilient support of engines and the like, the particular unit per se forming no part of the present invention, other than its cooperative function in the novel support organization disclosed herein.

As indicated in Figs. 4, 9 and 10 the resilient elements 23 are provided with an apertured connection 23b for attachment to the engine attachment fittings 24a. The forged brackets 22 are also provided with apertured lugs 22e extending substantially perpendicular to the general plane of the bracket in the region in which the inwardly extending lugs 22b intersect with the main portions of the bracket. These lugs 22e are adapted to provide a connection for the inner terminals of the struts 25 by means of the pins or bolts 25d. The forgings 22 are also preferably provided with stiffening ribs 22d along both its chordal base or long side and its radial edges, and lightening holes 22f through which the operating links (not shown) for the cowl flaps 21 may preferably pass. The exhaust collector ring 26 is provided with adjacent lugs 26a preferably welded thereto and apertured for bolting to the links 27 by the bolts 27b, the other end of the links being attached to the lugs 22c on the forging 22 by means of the bolts 27a.

It will accordingly be noted from the above described arrangement that the use of the forgings 22 and their respective strut braces 20, 25, and 30 enables the engine 24 to be resiliently suspended from a rigid mounting structure without the use of the complicated tubular triangulation heretofore necessary in bracing a circular ring mount. It will also be apparent from Fig. 2 that the three individual mounting assemblies provide adequate space between each assembly for access to the engine and its accessories while at the same time forming a supporting structure which is rigid in all directions and affords a rigid support for the cowl 19 and its supporting ring 18. Where the outline of the cowl is elliptical, or otherwise than circular, as shown in the cross-section in Fig. 2, the lower support assembly may preferably be connected to and braced from a supplementary framework 31 connected to the fire-wall bulkhead ring 17 and preferably lying in the plane of the fire-wall 17c.

Other forms and modifications of the present invention, which may become obvious to those skilled in the art, both with respect to the general arrangement and the details of the respective parts, are intended to fall within the scope and spirit of the present invention as more clearly defined in the appended claims.

I claim:

1. A mount for an engine comprising a pair of support rings longitudinally spaced along a common axis, tie members extending between and connecting said support rings, support members attached to a first of said support rings, strut members extending between said support members and the second said support ring and means for resiliently supporting an engine from said support members.

2. A support assembly for an engine mount including a pair of support rings longitudinally spaced along a common axis comprising a pair of tie members extending between and connecting said support rings, a plate-like member attached to a first of said support rings, strut members extending between and connecting said plate-like member and the second said support ring in the regions of the connections of the said tie members therewith, and means for resiliently connecting an engine to said plate-like member.

3. A mount for an engine comprising a fuselage terminal ring, a cowl support ring longitudinally spaced from and disposed about a common axis with respect to said fuselage ring, tie members interconnecting said rings disposed substantially parallel to said common axis, plate-like members attached to said fuselage ring, strut members connected to said cowl support ring and to portions of said plate-like members remote from the points of attachment of the latter to said fuselage ring, and resilient mounting units attached to said plate-like members adjacent the connections of the said strut members therewith for the resilient support of an engine.

4. In a mount for an aircraft engine including a pair of structural rings longitudinally spaced along a common axis and interconnected by structural tie elements, a rigid support for the attachment of resilient engine mounting units, the said support including a planar element obliquely disposed with respect to said axis, said planar element connected to a first of said rings and rigidly braced from the second of said rings, said planar element having attachment portions remote from said rings adapted for the resilient support of an engine.

5. A mount for an aircraft engine including a pair of longitudinally spaced support rings disposed about a common axis, tie members extending between and interconnecting said support rings, a plurality of plate-like members attached to a first of said support rings and obliquely disposed with respect to both said common axis and the transverse planes defined by said rings, strut members extending between said plate-like members and the second said support ring, said plate-like members formed to provide attachment portions transversely extending with respect to said common axis adapted for the support of an engine.

6. An aircraft power plant arrangement comprising a transverse bulkhead ring defining a forward terminal of a nacelle, a cowl support ring forwardly spaced from and co-axially disposed with respect to said fuselage ring, longitudinally extending tie elements interconnecting said rings, means associated with said cowl support ring for the attachment of a cowl and cowl flaps thereto, planar elements attached to said fuselage ring at remotely spaced corners of the chordal edge of said planar elements and obliquely disposed with respect to the transverse planes defined by said rings, said planar elements having offset lug portions adjacent its inwardly extending edge adapted for the attachment of an engine thereto, and brace means attached to said inner edges of said planar elements and to said cowl support ring for the rigid support of said planar elements.

7. In a support structure for an aircraft having at least two longitudinally spaced bulkhead rings, a planar element of forged construction formed to provide attachments to a first of said rings at the ends of the longer side of said planar element, the ends of said element defined by edges converging toward the axis of said bulkhead rings, an arcuate edge interconnecting said converging ends apertured for the attachment of an engine thereto, and strut means interconnecting said arcuate edge of said element with the second of said bulkhead rings.

8. A mount for an aircraft engine comprising a pair of support rings longitudinally spaced along a common axis, tie members extending between and connecting said support rings, a forged planar elements attached adjacent the ends of its longer side to a first of said support rings, said planar element obliquely disposed with respect to the transverse plane of said support ring such that it forms a face of an interrupted polygonal pyramid having its apex in the region of said common axis, strut means interconnecting further portions of said planar element with the second said support ring, and attachment means carried by said planar element for the resilient support of an aircraft engine.

9. A mount for an aircraft engine comprising a pair of transverse support rings, a plurality of longitudinally extending peripherally spaced tie members interconnecting said support rings, planar elements attached to a first of said support rings obliquely extending towards the central axis thereof, strut elements interconnecting the second said support ring in the region of the said tie member connections thereto and connected adjacent the opposed edges of said planar element, whereby each said planar element edge, tie and strut member form angularly spaced triangular stiffening frames, and means for resiliently supporting an engine from said planar elements.

10. In a supporting mount for a member disposed within a hollow body defined by at least two interconnected transverse bulkhead frames, a planar support element for said member having its longest side chordally disposed with respect to one of said frames, its adjacent edges radially disposed with respect to the central axis of said frames and said edges connected to said frames to form a rigid structure therewith.

JAMES R. MOOREHEAD.